United States Patent
Hung

[11] Patent Number: 5,975,472
[45] Date of Patent: Nov. 2, 1999

[54] VIDEO DISPLAY SUPPORT HAVING ANGLE ADJUSTMENT

[76] Inventor: Chin-Jui Hung, No. 400-8, Chung-Shan Rd., Ching-Shui Town, Taichung County, Taiwan

[21] Appl. No.: 09/196,346

[22] Filed: Nov. 19, 1998

[51] Int. Cl.$^6$ ..................................................... E04G 3/00
[52] U.S. Cl. ...................... 248/278.1; 248/415; 248/921
[58] Field of Search .............................. 248/278.1, 279.1, 248/276.1, 917, 919, 921, 922, 923, 415

[56] References Cited

U.S. PATENT DOCUMENTS

| | | | |
|---|---|---|---|
| 5,799,917 | 9/1998 | Li | 248/278.1 |
| 5,842,672 | 12/1998 | Sweere et al. | 248/278.1 |

*Primary Examiner*—Ramon O. Ramirez
*Attorney, Agent, or Firm*—Rosenberg, Klein & Lee

[57] ABSTRACT

A video display support includes a support arm having an air cylinder suspended on the inside, a bottom plate and a mounting assembly coupled to the support arm at one end, a video display mount coupled to the support arm at an opposite end through an X-axis adjustment connector and a Y-axis adjustment connector, and a angle adjustment structure coupled between the support arm and the bottom plate, wherein the angle adjustment structure includes a holder frame coupled between the support arm and the bottom plate, a shaft rotatably mounted in the holder frame, a locating frame mounted in the holder frame, a slide mounted on the locating frame and coupled to the piston rod of an air cylinder and moved in direction perpendicular to the shaft, and an adjustment screw inserted into an elongated slot at the holder frame and threaded into a screw hole at the shaft and a screw hole at the slide to secure the shaft and the slide together.

3 Claims, 5 Drawing Sheets

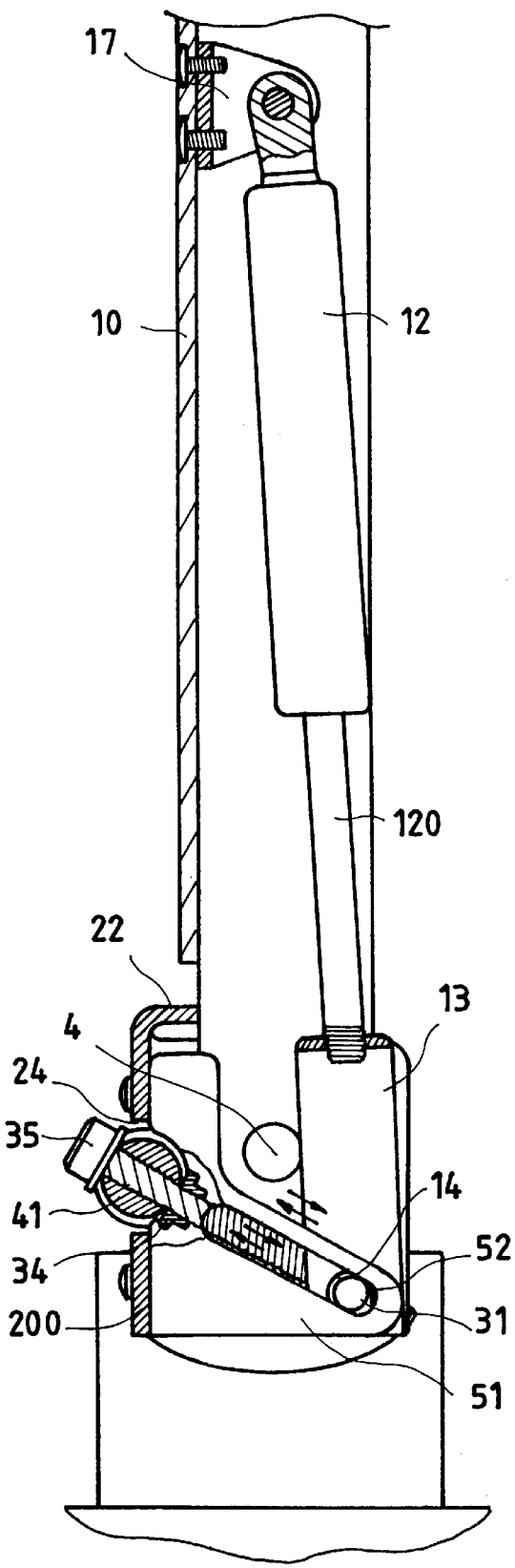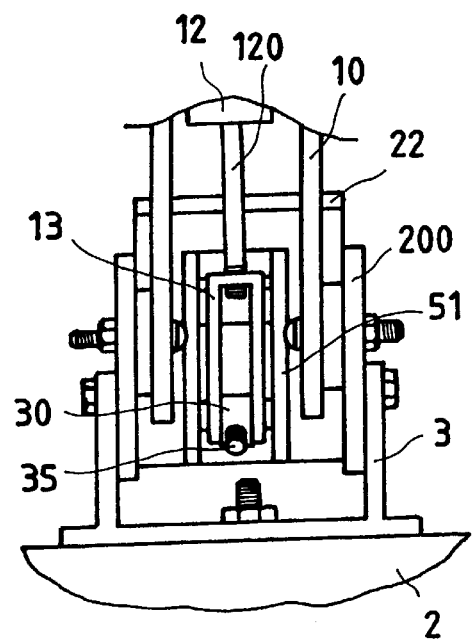
FIG.2B
FIG.2A

VIDEO DISPLAY SUPPORT HAVING ANGLE ADJUSTMENT

BACKGROUND OF THE INVENTION

The present invention relates to a video display support for supporting a video display, and more particularly to such a video display support which uses an air cylinder to support a support arm at the desired angle, and an angle adjustment structure to hold the support arm on a bottom plate above a mounting assembly.

A variety of video display supports have been disclosed for use to support a video display on for example a table. These video display supports commonly have a support arm that can be adjusted to the desired angle. The support arm is comprised of an upper part, a lower part pivoted together, and an adjustment knob which locks the upper part and the lower part in position. Because the adjustment knob wears quickly with use, the support arm cannot be firmly maintained at the desired angular position when the adjustment knob starts to wear. There is known another structure of video display support in which an air cylinder is installed on the inside to support the support arm at the desired angular position. This design is still not satisfactory in function due to its limited adjustable range.

SUMMARY OF THE INVENTION

It is the main object of the present invention to provide a video display support which enables the user to adjust the installed video display to the desired elevation, direction and angle. According to the present invention, the video display support comprises a support arm having a top end and a bottom end, a bottom plate connected to the bottom end of the support arm, a mounting assembly fastened to the bottom plate at a bottom side for mounting, an X-axis adjustment connector pivoted to the top end of the support arm, a Y-axis adjustment connector pivoted to the X-axis adjustment connector, a video display mount rotatably mounted on the Y-axis adjustment connector and locked in position by screw means, a shell covered on the support arm, an air cylinder suspended in the support arm, the air cylinder having a fixed end pivoted to an inside lug inside the support arm and a reciprocating piston rod connected to a substantially U-shaped positioning plate, the positioning plate having two arched bottom coupling notches respectively disposed at two vertical side walls thereof, and an angle adjustment structure coupled between the support arm and the bottom plate. According to another aspect of the present invention the angle adjustment structure comprises a holder frame coupled between the support arm and the bottom plate, a shaft rotatably mounted in the holder frame, a locating frame mounted in the holder frame, a slide mounted on the locating frame and coupled to the piston rod of an air cylinder and moved in direction perpendicular to the shaft, and an adjustment screw inserted into an elongated slot at the holder frame and threaded into a screw hole at the shaft and a screw hole at the slide to secure the shaft and the slide together.

BRIEF DESCRIPTION OF THE DRAWINGS

FIG. 2A is a side view in section of the present invention.

FIG. 2B is back side view of a part of the present invention showing the arrangement of the holder frame, the locating frame, the slide, the shaft, the adjustment screw, the positioning plate and the piston rod.

DETAILED DESCRIPTION OF THE PREFERRED EMBODIMENT

Figure 1:
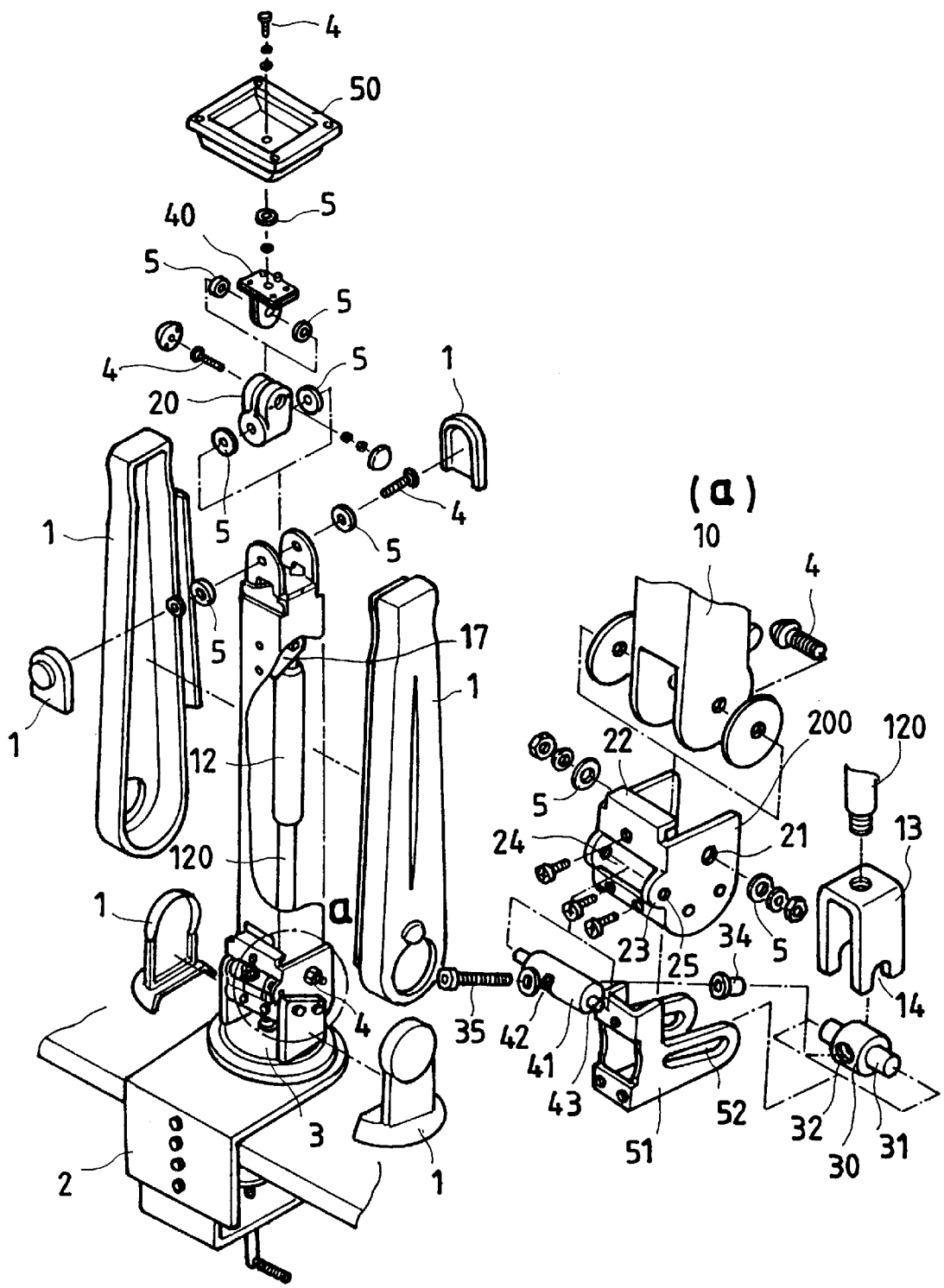
FIG. 1 is an exploded view of a video display support according to the present invention.

Referring to the annexed drawings in detail, a video display support in accordance with the present invention comprises a support arm 10, a bottom plate 3 connected to one end namely the bottom end of the support arm 10, a mounting assembly 2 fastened to the bottom plate 3 at the bottom side for mounting, an X-axis adjustment connector 20 fastened to an opposite end namely the top end of the support arm 10 by a bolt 4, a Y-axis adjustment connector 40 fastened to X-axis adjustment connector 20 by a bolt 4, a video display mount 50 fastened to the Y-axis adjustment connector by a bolt 4, and a shell 1 covered on the support arm 10. The support arm 10 is a hollow member having a lug 17 on the inside near its top end. An air cylinder 12 is coupled to the lug 17 inside the support arm 10, having a piston rod 120 connected to a substantially U-shaped positioning plate 13. The positioning plate 13 has two arched bottom coupling notches 14 at the ends of two vertical side walls thereof.

Referring to FIGS. 1, 2A and 2B, a holder frame 200 is coupled between the support arm 10 and the bottom plate 3. The holder frame 200 has a bottom side fixedly fastened to the bottom plate 3, two pivot holes 21 bilaterally disposed at the top and respectively pivoted to the bottom end of the support arm 10 by bolts 4, a transversely extended top stop flange 22, which limits the turning angle of the support arm 10 to a limited range relative to the holder frame 200, an axle housing 23 transversely disposed at a front side, two axle holes 25 respectively disposed at two opposite ends of the axle housing 23, and an elongated slot 24 axially disposed at the periphery of the axle housing 23. A shaft 41 is mounted in the axle housing 23, having two round rods 43 at two opposite ends respectively inserted into the axle holes 25, and a transverse screw hole 42 across the periphery on the middle. A locating frame 51 is mounted in the holder frame 200, having two parallel sliding slots 52 extended in direction perpendicular to the shaft 41. A slide 30 is coupled to the locating frame 51 inside the holder frame 200. The slide 30 comprises a screw hole 32 at the periphery on the middle, and two round rods 31 aligned at two opposite sides and respectively inserted into the sliding slots 52 at the locating frame 51. The round rods 31 each have an annular groove (not shown) around the periphery for engagement with the arched bottom coupling notches 14 of the U-shaped positioning plate 13. An adjustment screw 35 is inserted into the elongated slot 24 at the holder frame 200, and threaded into the screw hole 42 at the shaft 41 and the screw hole 32 at the slide 30 to secure the shaft 41 and the slide 30 together. Further, a nut 34 is threaded onto the adjustment screw 35, and retained between the shaft 41 and the slide 30.

Figure 3A:
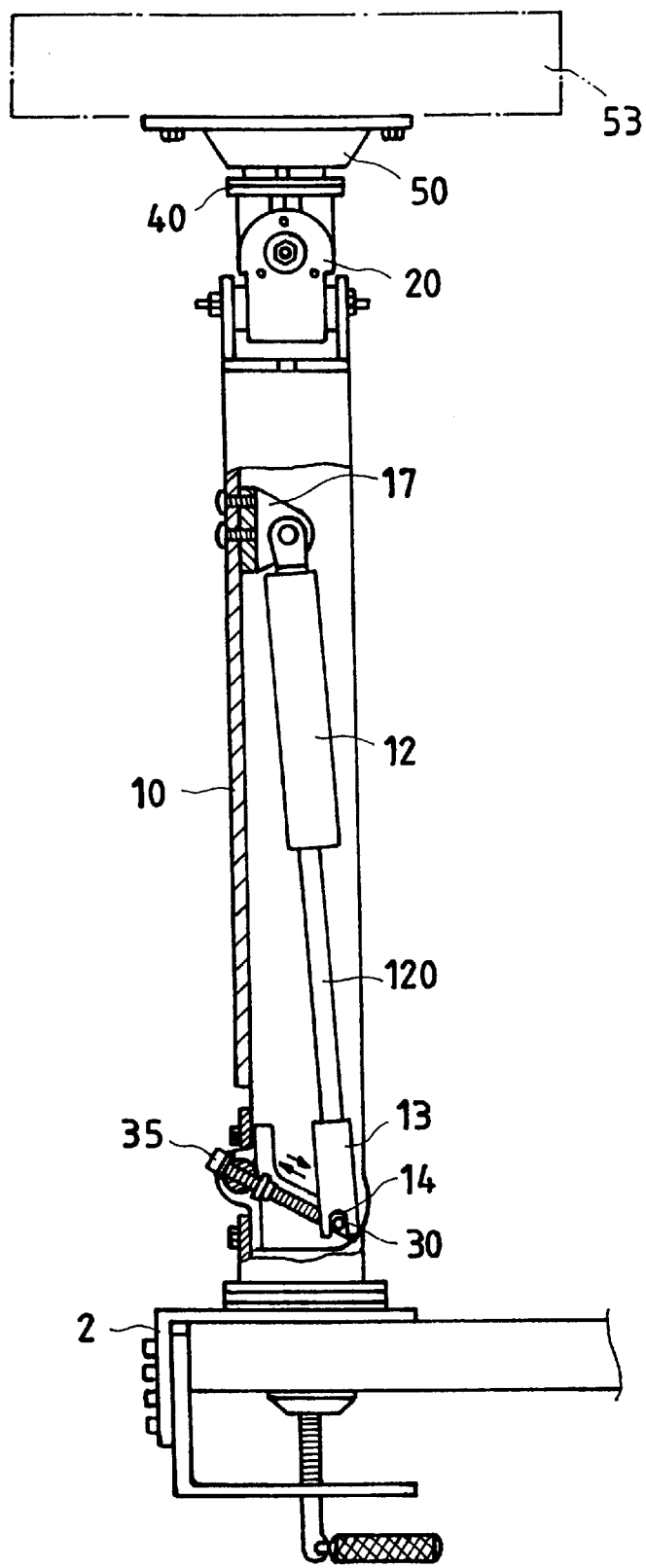
FIG. 3A shows the support arm of the video display support set in a vertical position.
Figures 3B, 3C:
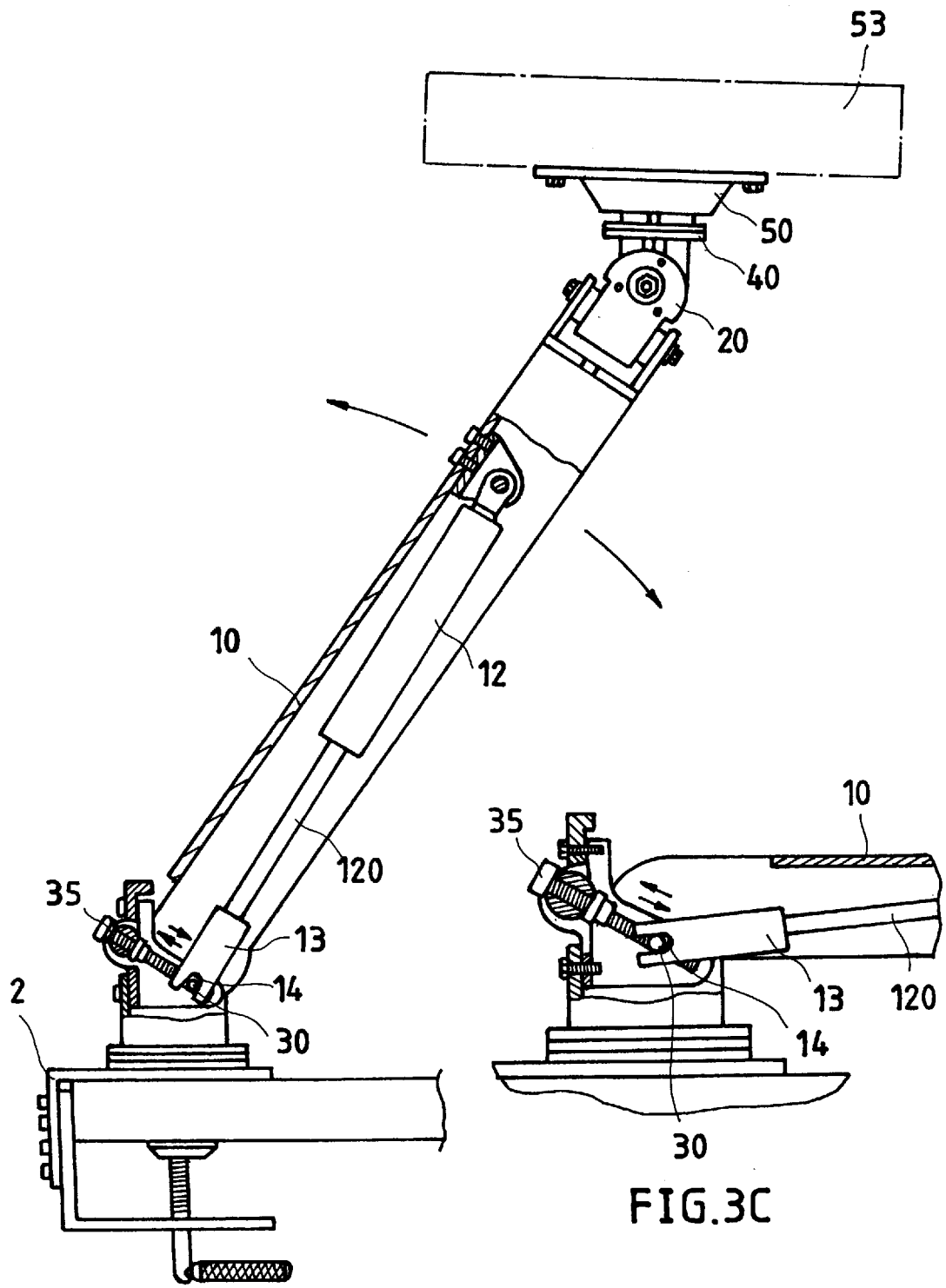
FIG. 3B shows the support arm of the video display support set in a tilted position.
FIG. 3C shows the support arm of the video display support set in a horizontal position.

Referring to FIGS. 3A, 3B and 3C and FIG. 2A and 2B again, when the adjustment screw 35 is loosened, the support arm 10 is tilted to the desired angle. Because the positioning plate 13 is fastened to the piston rod 120 and coupled to the round rods 31 of the slide 30, the support arm 10 can be conveniently adjusted to the desired angle. By means of rotating the adjustment screw 35 to move the slide 30 along the sliding slots 52 relative to the shaft 41, the air cylinder 12 is firmly supported at the adjusted angle. Therefore, when the adjustment screw 35 is loosened, the support arm 10 is allowed to be tilted to the desired angle. When the adjustment screw 35 is fastened tight, the support arm 10 is locked. Because the round rods 31 of the slide 30 are coupled to the arched bottom coupling notches 14 of the U-shaped positioning plate 13, the U-shaped positioning plate 13 can be turned with the air cylinder 12 and the support arm 1 around the round rods 31 of the slide 30 through 90°, i.e., the support arm 1 can be set in a vertical position shown in FIG. 2A, a horizontal position shown in FIG. 3C, or a tilted position shown in FIG. 3B.

Figure 4A:
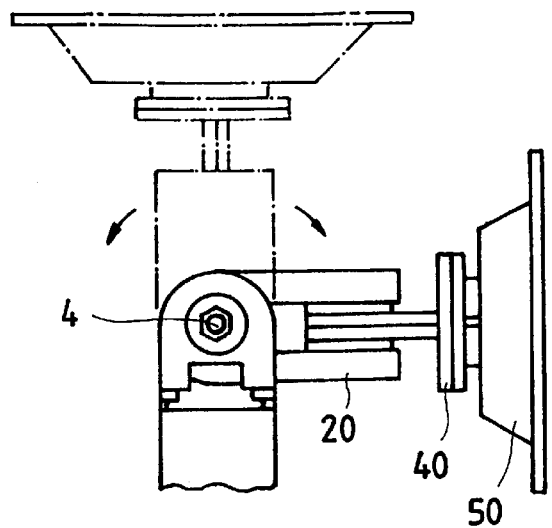
FIG. 4A is a schematic drawing showing the angular position of the video display support adjusted in X-axis direction.
Figure 4B:
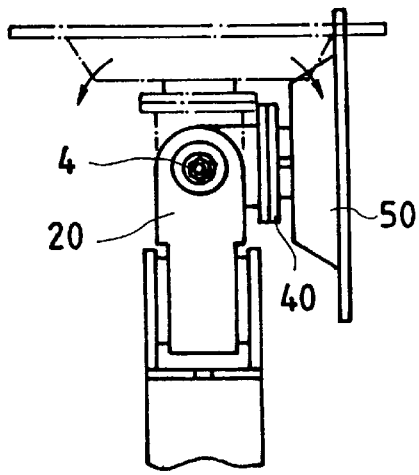
FIG. 4B is a schematic drawing showing the angular position of the video display support adjusted in Y-axis direction.
Figure 4C:
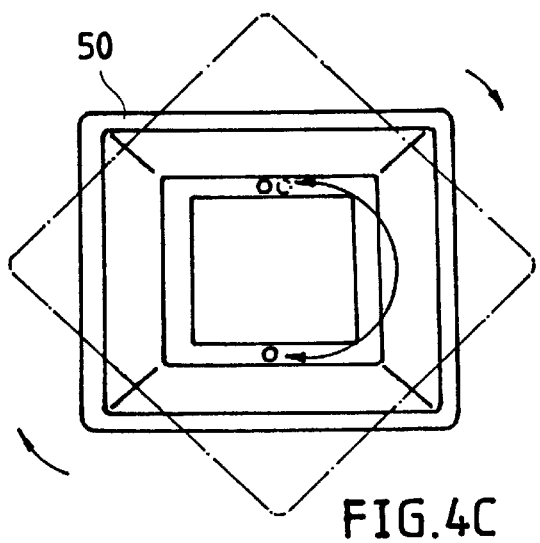
FIG. 4C is a schematic drawing showing the video display support adjusted horizontally through 360°.

Referring to FIGS. 4A, 4B and 4C, through the X-axis adjustment connector 20, the installed video display can be moved with the video display mount 50 in X-axis direction to the desired position relative to the support arm 10, and then locked by the respective bolt 4. Through the Y-axis adjustment connector 40, the installed video display can be moved with the video display mount 50 in Y-axis direction to the desired position relative to the support arm 10, and then locked by the respective bolt 4. When the bolt 4 which fastens the video display mount 50 to the Y-axis adjustment connector is loosened, the video display mount 50 can then be rotated horizontally through 360° to the desired angle. Furthermore, anti-slip plastic friction rings 5 are respectively mounted on the bolts 4 to ensure the connection between the related parts.

While only one embodiment of the present invention has been shown and described, it will be understood that various modifications and changes could be made thereunto without departing from the spirit and scope of the invention disclosed.

What the invention claimed is:

1. A video display support comprising a support arm having a top end and a bottom end, a bottom plate connected to the bottom end of said support arm, a mounting assembly fastened to said bottom plate at a bottom side for mounting, an X-axis adjustment connector pivoted to the top end of said support arm, a Y-axis adjustment connector pivoted to said X-axis adjustment connector, a video display mount fixedly fastened to said Y-axis adjustment connector, a shell covered on said support arm, an air cylinder suspended in said support arm, said air cylinder having a fixed end pivoted to an inside lug inside said support arm and a reciprocating piston rod connected to a substantially U-shaped positioning plate, said positioning plate having two arched bottom coupling notches respectively disposed at two vertical side walls thereof, and an angle adjustment structure coupled between said support arm and said bottom plate, wherein said angle adjustment structure comprises:

a holder frame coupled between said support arm and said bottom plate, said holder frame comprising a bottom side fixedly fastened to said bottom plate, two pivot holes bilaterally disposed at a top side thereof and respectively pivoted to the bottom end of said support arm by pivot means, an axle housing transversely disposed at a front side thereof, two axle holes respectively disposed at two opposite ends of said axle housing, and an elongated slot axially disposed at the periphery of said axle housing;

a shaft mounted in said axle housing, said shaft comprising two round rods at two opposite ends thereof respectively inserted into the axle holes at said axle housing, and a transverse screw hole across the periphery thereof on the middle;

a locating frame mounted in said holder frame, said locating frame comprising two parallel sliding slots extended in direction perpendicular to said shaft;

a slide coupled to said locating frame inside said holder frame, said slide comprising a screw hole at the periphery thereof on the middle, and two round rods aligned at two opposite sides and respectively inserted into said sliding slots at said locating frame and engaged with the arched bottom coupling notches of said U-shaped positioning plate; and an adjustment screw inserted into the elongated slot at said holder frame, and threaded into the screw hole at said shaft and the screw hole at said slide to secure said shaft and said slide together.

2. The video display support of claim 1 wherein said holder frame comprises a transversely extended top stop flange, which limits the turning angle of the support arm to a limited range relative to said holder frame.

3. The video display support of claim 1 wherein said angle adjustment structure further comprises a nut threaded onto said adjustment screw, and retained between said shaft and said slide.

* * * * *